United States Patent [19]

Goto et al.

[11] Patent Number: 5,391,522
[45] Date of Patent: Feb. 21, 1995

[54] GLASS-CERAMIC FOR MAGNETIC DISKS AND METHOD FOR MANUFACTURING THE SAME

[75] Inventors: Naoyuki Goto; Katsuhiko Yamaguchi, both of Sagamihara, Japan

[73] Assignee: Kabushiki Kaisya Ohara, Kanagawa, Japan

[21] Appl. No.: 248,757

[22] Filed: May 25, 1994

Related U.S. Application Data

[63] Continuation of Ser. No. 92,551, Jul. 16, 1993, abandoned.

[30] Foreign Application Priority Data

May 19, 1993 [JP]  Japan .................. 5-139989

[51] Int. Cl.$^6$ .................. C03C 10/12; C03C 10/14
[52] U.S. Cl. .................. 501/4; 501/6; 501/63
[58] Field of Search .................. 501/4, 6, 63

[56] References Cited

U.S. PATENT DOCUMENTS

| | | | |
|---|---|---|---|
| 2,971,853 | 2/1961 | Stookey | 501/4 |
| 3,220,815 | 11/1965 | McMillan et al. | 501/63 X |
| 3,231,456 | 1/1966 | McMillan et al. | 501/5 X |
| 3,238,085 | 3/1966 | Hayami et al. | 501/4 |
| 3,804,608 | 4/1974 | Gaskell et al. | 65/33 |
| 3,977,857 | 8/1976 | Mattox | 501/5 X |
| 4,414,282 | 11/1983 | McCollister | 501/5 X |
| 4,480,044 | 10/1984 | McAlinn | 501/4 |
| 4,515,634 | 5/1985 | Wu et al. | 501/5 X |
| 4,672,152 | 6/1987 | Shinohara et al. | 501/69 X |
| 5,219,799 | 6/1993 | Beall et al. | 501/5 |

*Primary Examiner*—Mark L. Bell
*Assistant Examiner*—David Sample
*Attorney, Agent, or Firm*—Hedman, Gibson & Costigan

[57] ABSTRACT

A glass-ceramic for a magnetic disk substrate in which the grain size can be controlled and the surface roughness after polishing is within the range from 15 Å to 50 Å is provided by heat treating a base glass including in weight percent:

| | |
|---|---|
| $SiO_2$ | 65–83% |
| $Li_2O$ | 8–13% |
| $K_2O$ | 0–7% |
| $MgO + ZnO + PbO$ | 0.5–5.5% |
| in which | |
| $MgO$ | 0.5–5.5% |
| $ZnO$ | 0–5% |
| $PbO$ | 0–5% |
| $P_2O_5$ | 1–4% |
| $Al_2O_3$ | 0–7% |
| $As_2O_3 + Sb_2O_3$ | 0–2% |

The glass-ceramic contains lithium disilicate ($Li_2O \cdot 2SiO_2$) and alpha-quartz ($SiO_2$) as the main crystal phases.

14 Claims, 2 Drawing Sheets

Ra   =   35 Å

Rmax =  274 Å

Ra   =   11 Å

Rmax =   96 Å

X5000

X5000

GLASS-CERAMIC FOR MAGNETIC DISKS AND METHOD FOR MANUFACTURING THE SAME

This application is a continuation of U.S. patent application Ser. No. 08/092,551, filed Jul. 16, 1993, now abandoned.

BACKGROUND OF THE INVENTION

This invention relates to a glass-ceramic for magnetic disks having a crystal structure suitable for use as a material for a magnetic disk substrate and having improved surface characteristics after polishing and a method for manufacturing the same.

There has been a rapid progress in developments in magnetic diks demand for which has recently increased remarkably as external media of large scale computers and personal computers. Characteristics required generally for a magnetic disk substrate are as follows:

(1) In start/stop (CSS) characteristics of a magnetic disk, the magnetic disk should have not a completely smooth surface but a surface whose surface roughness (Ra) is controlled to a range from 15 Å to 50 Å in order to prevent adsorption between the head and the disk and damage to the head and media.

(2) Since the amount of lifting of the head tends to decrease to the order of 0.1 $\mu$m to 0.05 $\mu$m owing to improvement of recording density of the magnetic disk, the surface of the disk must be flat and relatively smooth.

(3) The material of the magnetic disk substrate must not include anisotropic crystal or other defects and its structure must be dense, homogenious and fine.

(4) The material must have sufficient mechanical strength and hardness for standing a high speed rotation and-contact with the head.

(5) The material must not contain $Na_2O$ ingredient in principle because the $Na_2O$ ingredient causes dispersion of sodium ion during the film forming process with resulting deterioration in characteristics of the film.

(6) The material must have chemical durability against rinsing and etching with various chemicals.

Aluminum alloy has been conventionally used as a material of magnetic disk substrate. The aluminum alloy substrate, however, tends to produce a substrate surface having projections or spot-like projections and depressions during the polishing process due to defects inherent in the material. As a result, the aluminum alloy substrate is not sufficient in flatness and surface roughness and cannot cope with the recent requirement for high density recording necessitated by increase in the amount of information.

As a material for overcoming this problem of the aluminum alloy substrate, known in the art is a glass substrate for magnetic disks made of chemically tempered glass. This glass substrate, however, has the following disadvantages:

(1) Polishing is made after chemical tempering and so the tempered layer tends to cause instability in thinning the disk substrate.

(2) For improving the start/stop (CSS) characteristics, the substrate must be subjected to processings for improving its mechanical and chemical textures. This prevents mass production of the product at a competitive cost.

(3) Since the $Na_2O$ ingredient is included as an essential ingredient in the glass, the film forming characteristic of the glass is deteriorated with the result that a surface coating processing becomes necessary. It has recently been put into practice in the field of chemically tempered glass and crystallized glass-ceramic to make the surface of the glass rough during the polishing process for overcoming the problem of the texture processing for improving the start/stop (CSS) characteristics. This technique however is not sufficient either for realizing a stable mass production of the product at a competitive cost.

Aside from the aluminum alloy substrate and chemically tempered glass substrate, known also in the art are glass-ceramics which satisfy some of the above described requirements. For example, the $SiO_2$–$Al_2O_3$–$Li_2O$ system crystallized glass-ceramic described in the Japanese Patent Application Laid-open No. Sho 60-229234 contains beta-quartz solid solution or beta-spodumene solid solution and has a grain diameter of crystal ranging from about 0.1 $\mu$m to about 1.0 $\mu$m. For another example, the $SiO_2$–$Li_2O$ system glass-ceramic described in the Japanese Patent Application Laid-open No. Sho 62-72547 contains lithium disilicate and lithium metasilicate as a main crystalline phase. The lithium disilicate phase has a plate-like crystal having a grain diameter of crystal in the range from about 0.3 $\mu$m to about 1.5 $\mu$m and the lithium metasilicate phase has a granular crystal having a grain diameter of crystal in the range from about 0.3 $\mu$m to about 0.5 $\mu$m. These glass-ceramics, however, require the texture processings for making the surface of the glass-ceramics rough after the polishing process for improving the start/stop (CSS) characteristics which are essential for the material of magnetic disk substrate.

For overcoming these problems, the Japanese Patent Application Laid-open No. Hei 2-247821 proposes a glass-ceramic containing a crystal phase having a texture of sheet-like or chain-like silicate. The anisotropic crystal of this glass-ceramic having an acicular or rod-shaped structure causes significant holes and pits with the result that a sufficient surface roughness cannot be obtained. Further, since the crystal of this glass-ceramic contains $Na_2O$ ingredient, there occurs dispersion of sodium ion in the film foaming process and this adversely affects the characteristics of the film.

It is, therefore, an object of the invention to provide a crystallized glass-ceramic for magnetic disks which has eliminated the disadvantages of the prior art products and has excellent surface characteristics after polishing by controlling the crystal structure and crystal grain of a crystal produced. It is also an object of the invention to provide a method for manufacturing such glass-ceramic.

SUMMARY OF THE INVENTION

Accumulated studies and experiments made by the inventors of the present invention for achieving the above described object of the invention have resulted in the finding, which has led to the present invention, that a glass-ceramic obtained by subjecting to heat treatment a base glass containing, as an essential ingredient, a MgO ingredient in the $SiO_2$–$Li_2O$–$P_2O_5$ system has, as a crystal phase, alpha-quartz ($SiO_2$) whose grown crystal grain (secondary grain) has a globular grain structure and has excel lent surface characteristics of a polished surface by controlling the size of the crystal grain.

A glass-ceramic for magnetic disks achieving the above described object of the invention is formed by subjecting to heat treatment a base glass comprising in weight percent:

| | |
|---|---|
| $SiO_2$ | 65–83% |
| $Li_2O$ | 8–13% |
| $K_2O$ | 0–7% |
| $MgO + ZnO + PbO$ | 0.5–5.5% |
| in which | |
| MgO | 0.5–5.5% |
| ZnO | 0–5% |
| PbO | 0–5% |
| $P_2O_5$ | 1–4% |
| $Al_2O_3$ | 0–7% |
| $As_2O_3 + Sb_2O_3$ | 0–2% | said glass-ceramic containing lithium disilicate ($Li_2O.2SiO_2$) and alpha-quartz ($SiO_2$) as a main crystal phase.

DETAILED DESCRIPTION OF THE INVENTION

Figure 1A:
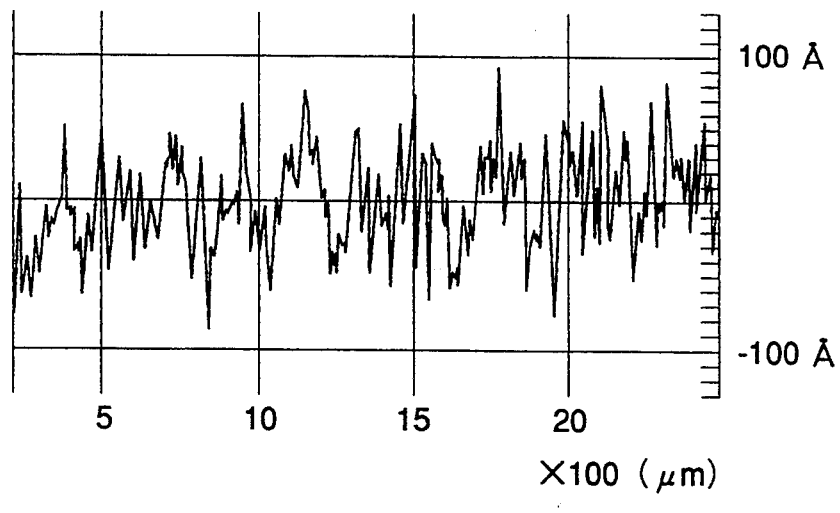

The composition of the glass-ceramic of the present invention is expressed on the basis of composition of oxides as in its base glass. The above described content ranges of the respective ingredients have been selected for the reasons stated below.

The $SiO_2$ ingredient is an important ingredient which produces crystals of lithium disilicate ($Li_2O.2SiO_2$) and alpha-quarts ($SiO_2$) as a main crystal phase by heat treating the base glass. If the amount of this ingredient is below 65%, the crystal produced in the glass-ceramic is instable and its texture tends to become too rough. If the amount of this ingredient exceeds 83%, difficulty arises in melting the base glass.

The $Li_2O$ ingredient is also an important ingredient which produces lithium disilicate ($Li_2O.2SiO_2$) crystal as a main crystal phase by heat treating the base glass. If the amount of this ingredient is below 8%, growth of this crystal becomes difficult and melting of the base glass becomes also difficult. If the amount of this ingredient exceeds 13%, the grown crystal of the glass-ceramic becomes instable and its texture tends to become too rough and, besides, chemical durability and hardness of the glass-ceramic are deteriorated.

The $K_2O$ ingredient is an ingredient which improves melting property of the base glass and can be included up to 7%.

The MgO ingredient is an important ingredient which has been found in the present invention to cause a crystal grain of alpha-quartz ($SiO_2$) as the main crystal phase to grow randomly in the entire secondary grain structure. If the amount of this ingredient is below 0.5%, the above described effect cannot be obtained whereas if the amount of this ingredient exceeds 5.5%, growth of a desired Crystal becomes difficult.

The ZnO and PbO ingredients may also be added because they have a function similar to that of MgO. If the amount of the ZnO or PbO ingredient exceeds 5%, growth of a desired crystal becomes difficult.

For the same reason, the total amount of the MgO, ZnO and PbO ingredients should be within the range from 0.5–5.5%.

The $P_2O_5$ ingredient is an essential ingredient as nucleating agent for the glass-ceramic. If the amount of this ingredient is below 1%, a desired crystal cannot be produced whereas if the amount of this ingredient exceeds 4%, the grown crystal of the glass-ceramic becomes instable and too rough and, besides, its stability against devitrification is deteriorated.

The $Al_2O_3$ ingredient is an effective ingredient for improving chemical durability of the crystallized glass-ceramic. If the amount of this ingredient exceeds 7%, the melting property of the base glass is deteriorated and, as a result, the rate of crystal growth of alpha-quartz ($SiO_2$) as the main crystal phase is reduced.

The $As_2O_3$ and/or $Sb_2O_3$ ingredients may be added as refining agents in melting the base glass. It will suffice if the total amount of one or both of these ingredients-up to 2% is added to the glass.

In addition to the above described ingredients, one or more of $B_2O_3$, CaO, SrO, BaO, $TiO_2$, $SnO_2$ and $ZrO_2$ ingredients may be added in a small amount within the range in which desired properties of the glass-ceramic according to the invention will not be impaired. For improving electric conductivity, one or more of $V_2O_5$, $MnO_2$, CuO, $Cr_2O_3$ and $SnO_2$ ingredients up to 5% may be added.

As other crystals than the above described crystals which constitute the main crystal phase, lithium metasilicate ($Li_2O.SiO_2$) and alpha-cristobalite ($SiO_2$) can be grown.

According to the method for manufacturing the glass-ceramic according to the invention, the base glass having the above described composition is molten and after being subjected to heat forming or cold forming, is heat treated for crystallization under a temperature of 900° or below. The glass-ceramic thus heat treated is then subjected to the lapping process and finally polishing process and the surface roughness (Ra) after final polishing comes within the range from 15 Å to 50 Å.

EXAMPLES

Preferred examples of the glass-ceramic according to the invention will now be described. Table 1 shows examples (No. 1 to No. 11) of the glass-ceramic for magnetic disks according to the invention and a comparative example of the prior art $SiO_2$–$Li_2O$–$Al_2O_3$–$P_2O_5$ system glass-ceramic together with results of measurements of the temperatures of the heat treatment, time of the heat treatment, diameter of grown crystal grain of alpha-quartz, main crystal phases and surface roughness (Ra) after polishing. In the Table, α–Q represents alpha-quartz ($SiO_2$) and α–Cry represents alpha-cristobalite ($SiO_2$).

TABLE 1

| | (weight %) | | | | | | |
|---|---|---|---|---|---|---|---|
| | Examples | | | | | | |
| No. | 1 | 2 | 3 | 4 | 5 | 6 | 7 |
| $SiO_2$ | 67.5 | 69.0 | 69.5 | 73.0 | 74.0 | 75.5 | 76.0 |
| $Li_2O$ | 10.0 | 9.0 | 9.0 | 8.0 | 12.5 | 10.0 | 10.5 |
| $Al_2O_3$ | 6.0 | 5.0 | 5.5 | 5.0 | 4.5 | 4.5 | 4.0 |
| MgO | 2.5 | 3.5 | 1.0 | 4.0 | 2.0 | 1.0 | 2.5 |
| ZnO | 1.0 | 0.5 | 0.5 | 0.5 | | | 0.5 |
| PbO | 1.5 | 1.5 | 4.0 | | 2.0 | 2.0 | |
| $K_2O$ | 6.0 | 7.0 | 6.0 | 4.0 | | 4.5 | 4.0 |

TABLE 1-continued

| (weight %) | | | | | | | |
|---|---|---|---|---|---|---|---|
| $P_2O_5$ | 2.0 | 1.5 | 2.0 | 4.0 | 2.5 | 2.0 | 2.0 |
| $As_2O_3$ | 0.5 | 0.5 | | 0.5 | 0.5 | 0.5 | 0.5 |
| $Sb_2O_3$ | | | 0.5 | | | | |
| Others | CaO 1.0 | BaO 1.5 | $TiO_2$ 2.0 | SrO 1.0 | $SnO_2$ 2.0 | | |
|  | $B_2O_3$ 2.0 | $ZrO_2$ 1.0 | | | | | |
| Temperature of crystllization (°C.) | 750 | 760 | 770 | 780 | 780 | 750 | 780 |
| Time of crystallization (Hr) | 2 | 3 | 2 | 3 | 3 | 2 | 2 |
| Crystal phase | $Li_2O.2SiO_2$ $\alpha - Q$ | $Li_2O.2SiO_2$ $\alpha - Q$ | $Li_2O.2SiO_2$ $\alpha - Q$ | $Li_2O.2SiO_2$ $\alpha - Q$ | $Li_2O.2SiO_2$ $\alpha - Q$ | $Li_2O.2SiO_2$ $\alpha - Q$ | $Li_2O.2SiO_2$ $\alpha - Q$ |
| $\alpha - Q$ diameter of secondary grain ($\mu$) | 0.7 | 0.6 | 0.9 | 1.3 | 1.5 | 0.8 | 1.2 |
| Surface roughness (Å) Ra | 16 | 15 | 18 | 35 | 42 | 18 | 30 |

| | Examples | | | | Comparative |
|---|---|---|---|---|---|
| No. | 8 | 9 | 10 | 11 | Example |
| $SiO_2$ | 76.5 | 78.5 | 82.3 | 82.0 | 71.0 |
| $Li_2O$ | 10.5 | 9.0 | 12.0 | 11.0 | 12.0 |
| $Al_2O_3$ | 3.5 | 2.0 | | 1.3 | 9.6 |
| MgO | 1.0 | 2.5 | 1.0 | 1.0 | |
| ZnO | 2.0 | 1.0 | | | |
| PbO | | 1.0 | | | 0.9 |
| $K_2O$ | 4.0 | 4.0 | 2.5 | 2.5 | |
| $P_2O_5$ | 2.0 | 1.5 | 1.7 | 1.7 | 1.9 |
| $As_2O_3$ | 0.5 | 0.5 | 0.5 | 0.5 | |
| $Sb_2O_3$ | | | | | |
| Others | | | | | $Na_2O$ 3.8 |
|  | | | | | CaO 0.4 |
|  | | | | | SrO 0.4 |
| Temperature of crystllization (°C.) | 780 | 780 | 810 | 840 | 840 |
| Time of crystallization (Hr) | 5 | 2 | 2 | 2 | 2 |
| Crystal phase | $Li_2O.2SiO_2$ $\alpha - Q$ | $Li_2O.2SiO_2$ $\alpha - Q$ | $Li_2O.2SiO_2$ $\alpha - Q$ | $Li_2O.2SiO_2$ $\alpha - Q$ | $Li_2O.2SiO_2$ $\alpha - $ cry |
| $\alpha - Q$ diameter of secondary grain ($\mu$) | 1.5 | 1.4 | 1.0 | 1.3 | 0.2 |
| Surface roughness (Å) Ra | 40 | 36 | 20 | 33 | 10 |

Figure 1B:
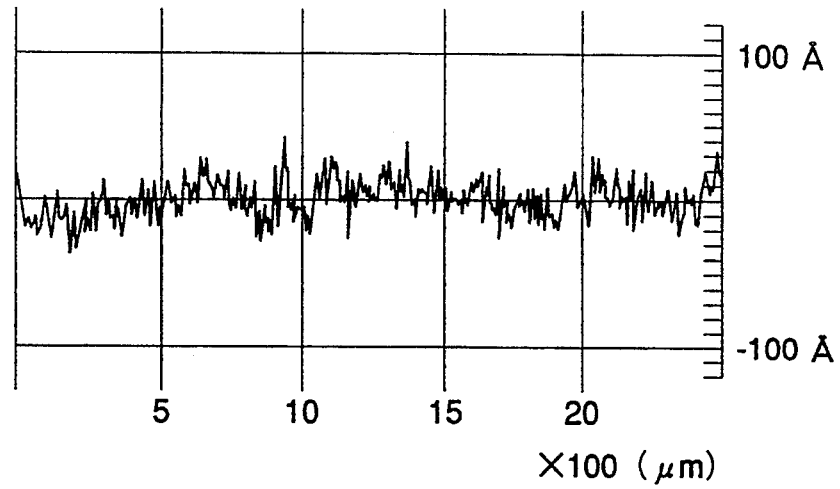
Figure 2A:
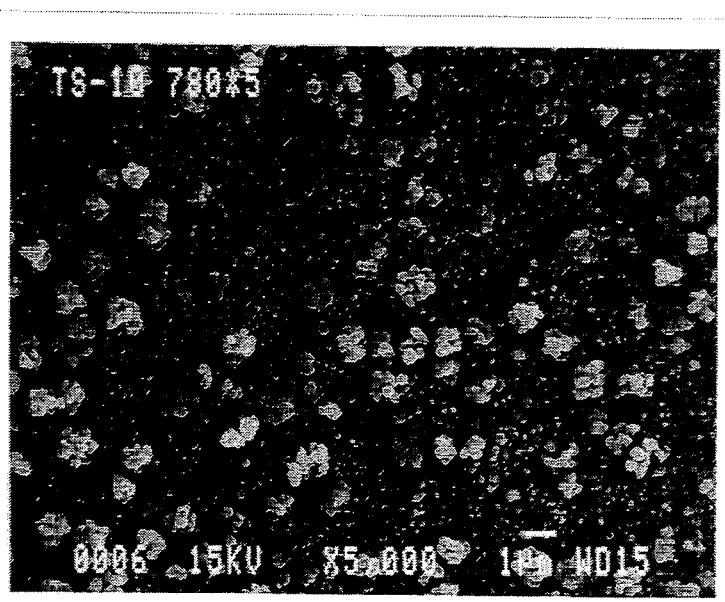
Figure 2B:
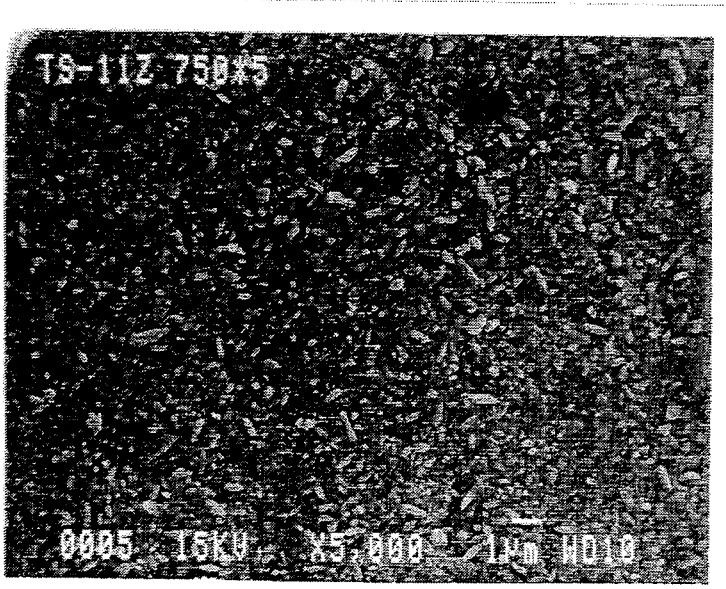

In the accompanying drawings, FIG. 1A shows the surface roughness (Ha) after polishing of the glass-ceramic of Example 4 in Table 1 and FIG. 1B that of the glass-ceramic of the comparative example in Table 1 for comparison. FIG. 2A shows a scanning microscopic photograph of the crystal structure of the glass-ceramic of Example 4 and FIG. 2B that of the glass-ceramic of the comparative example for comparison. In the photographs of FIGS. 2A and 2B, the white line scales represent 1. $\mu$m.

For manufacturing the glass-ceramics of the above described examples, materials including oxides, carbonates and nitrates are mixed and molten in a conventional melting apparatus at a temperature within the range from about 1350° C. to about 1500° C. The molten glass is stirred to homogenize it and thereafter formed into a desired shape and annealed to provide a formed glass. Then, this formed glass is subjected to heat treatment to produce the crystal nucleus and is held for about one to five hours at the above described temperature of crystallization to produce the desired glass-ceramic. In making a specimen for measuring the surface roughness (Ra), the above described glass-ceramic is lapped for about 10 to 20 minutes with grains having average grain diameters ranging from 9 $\mu$m to 12 $\mu$m and then is finally polished for about 30 to 40 minutes with cerium oxide having average grain diameters ranging from 1 $\mu$m to 2 $\mu$m.

As shown in Table 1, the glass-ceramic of Example No. 4 has the desired surface roughness but the glass-ceramic of the comparative example has no such desired surface roughness. As will be apparent from the microscopic photographs of FIGS. 2A and 2B, the crystal grains of the glass-ceramic of Example No. 4 exhibit the globular secondary grain structure and are uniformly distributed in the glass-ceramic whereas the crystal grains of the comparative example exhibit the acicular or rod-like grain structure and, accordingly, the desired surface roughness cannot be obtained. As to the grain diameter of the glass-ceramic according to the invention, the grain diameter can be controlled to the range from 0.3 $\mu$m to 3 $\mu$m by heat treatment.

In summing up, the glass-ceramic for magnetic disks according to the invention is obtained by heat treating a $SiO_2$-$LiO_2$-$P_2O_5$-MgO system glass of a specific composition range and, therefore, the main crystal phase thereof consists of lithium disilicate ($Li_2O.2SiO_2$) and alpha-quartz ($SiO_2$). The grown crystal grain (secondary grain) of alpha-quartz has a globular grain structure which enables control of the grain size by heat treatment and achievement of a desired surface roughness of the polished surface whereby the glass-ceramic according to the invention can be utilized as an excellent magnetic disk substrate.

According to the method for manufacturing the glass-ceramic according to the invention comprising the steps of melting and forming the above described base glass and then subjecting the formed glass to heat treatment and crystallizing processing, the glass-ceramic which has excellent characteristics can be manufactured at good yield.

What is claimed is:

1. A glass-ceramic for magnetic disks formed by subjecting to heat treatment a base glass which consists essentially of in weight percent:

| $SiO_2$ | 65–83% |
| --- | --- |
| $Li_2O$ | 8–13% |
| $K_2O$ | 0–7% |
| $MgO + ZnO + PbO$ | 0.5–5.5% |
| in which | |
| MgO | 0.5–5.5% |
| ZnO | 0.5–5% |
| PbO | 0–5% |
| $P_2O_5$ | 1–4% |
| $Al_2O_3$ | 0–7% |
| $As_2O_3 + Sb_2O_3$ | 0–2% | said glass-ceramic containing lithium disilicate ($Li_2O \cdot 2SiO_2$) and alpha-quartz ($SiO_2$) as the main crystal phases.

2. A glass-ceramic as defined in claim 1 wherein a grown crystal grain (secondary grain) of alpha-quartz has a globular grain structure.

3. A glass-ceramic as defined in claim 2 wherein the size of the crystal grain is controlled to the range from 0.3 μm to 3 μm by heat treatment and surface roughness (Ra) of the ground surface is in the range from 15Å to 50Å.

4. A glass-ceramic for magnetic disks as defined in claim 1 wherein the $Li_2O$ is 9%.

5. A glass-ceramic for magnetic disks as defined in claim 1 wherein the $Li_2O$ is 10%.

6. A glass-ceramic for magnetic disks as defined in claim 1 wherein the $Li_2O$ is 11%.

7. A glass-ceramic for magnetic disks as defined in claim 1 wherein the $Li_2O$ is 8%.

8. A glass-ceramic for magnetic disks as defined in claim 1 wherein the $Li_2O$ is 10.5%.

9. A glass-ceramic for magnetic disks as defined in claim 1 wherein the $K_2O$ is 0%.

10. A glass ceramic as defined in claim 1 wherein the glass ceramic is of the formula:

| $SiO_2$ | 73.0% |
| --- | --- |
| $Li_2O$ | 8% |
| $K_2O$ | 4% |
| $MgO + ZnO + PbO$ | 4.5% |
| in which MgO | 4.0% |
| ZnO | 0.5% |
| PbO | 0% |
| $P_2O_5$ | 4% |
| $Al_2O_3$ | 5% |
| $As_2O_3$ | 0.5% |
| SrO | 1.0%. |

11. A glass ceramic as defined in claim 1 wherein the glass ceramic is of the formula:

| $SiO_2$ | 76.0% |
| --- | --- |
| $Li_2O$ | 10.5% |
| $K_2O$ | 4% |
| $MgO + ZnO + PbO$ | 3% |
| in which MgO | 2.5% |
| ZnO | 0.5% |
| PbO | 0% |
| $P_2O_5$ | 2% |
| $Al_2O_3$ | 4% |
| $As_2O_3$ | 0.5%. |

12. A glass ceramic as defined in claim 1 wherein the glass ceramic is of the formula:

| $SiO_2$ | 76.5% |
| --- | --- |
| $Li_2O$ | 10.5% |
| $K_2O$ | 4% |
| $MgO + ZnO + PbO$ | 3% |
| in which MgO | 1.0% |
| ZnO | 2.0% |
| PbO | 0% |
| $P_2O_5$ | 2% |
| $Al_2O_3$ | 3.5% |
| $As_2O_3$ | 0.5%. |

13. A glass-ceramic for magnetic disks formed by subjecting to heat treatment a base glass which consists essentially of in weight percent of:

| $SiO_2$ | 65–83% |
| --- | --- |
| $Li_2O$ | 8–13% |
| $K_2O$ | 0–7% |
| $MgO + ZnO + PbO$ | 0.5–5.5% |
| in which | |
| MgO | 0.5–5.5% |
| ZnO | 0.5–5% |
| PbO | 0–5% |
| $P_2O_5$ | 1–4% |
| $Al_2O_3$ | 0–7% |
| $As_2O_3 + Sb_2O_3$ | 0–2% | said glass-ceramic containing lithium disilicate ($Li_2O \cdot 2SIO_2$) and alpha-quartz ($SiO_2$) as the main crystal phases said glass ceramic having been subjected to a lapping and polishing process which produces a surface roughness from 15 Å to 50 Å.

14. A glass-ceramic for magnetic disks as defined in claim 13 wherein the PbO is 1 to 4%.

* * * * *